W. H. VOSS.
GEARING FOR WASHING MACHINES.
APPLICATION FILED MAR. 15, 1915.

1,229,687.

Patented June 12, 1917.
2 SHEETS—SHEET 1.

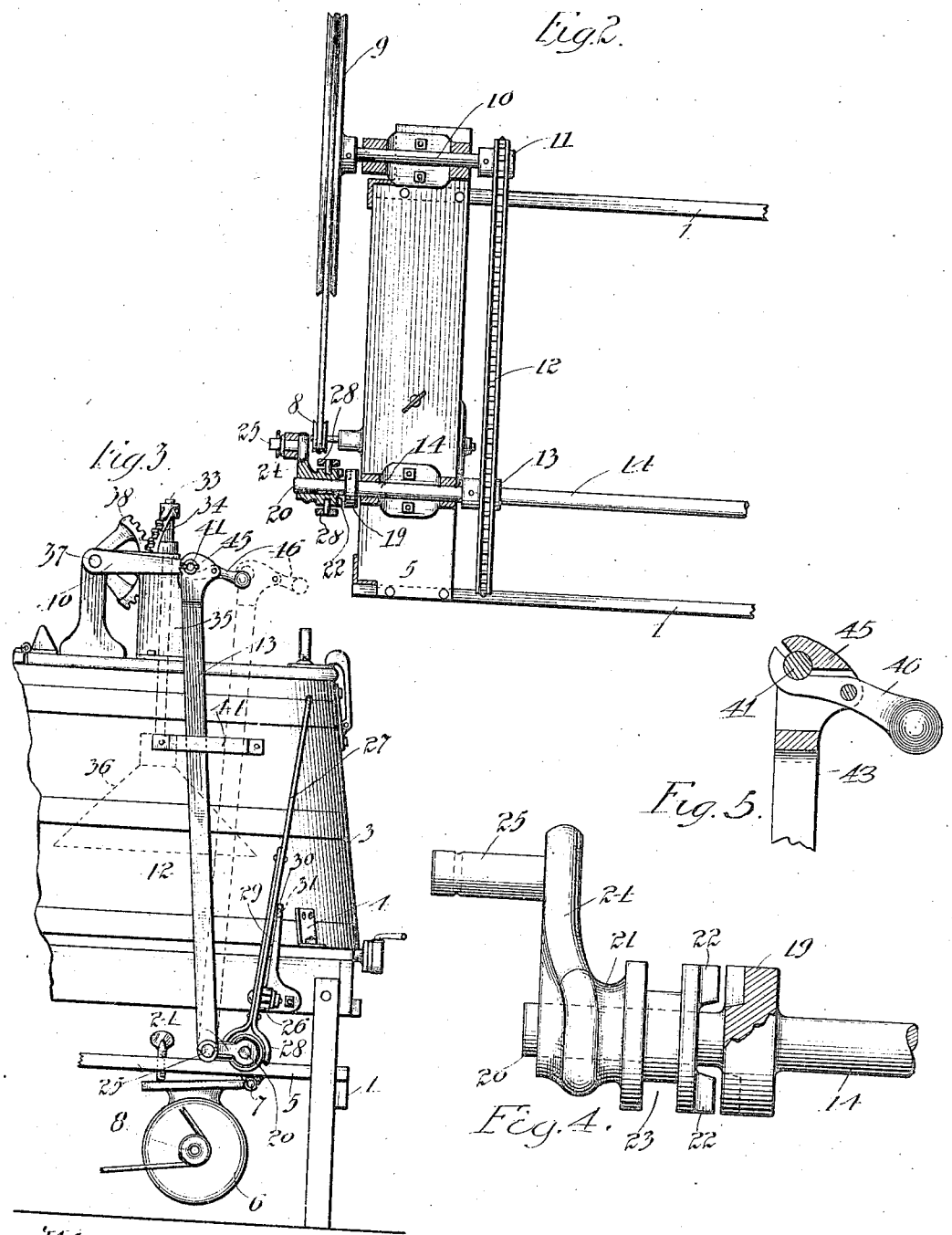

UNITED STATES PATENT OFFICE.

WILLIAM H. VOSS, OF DAVENPORT, IOWA.

GEARING FOR WASHING-MACHINES.

1,229,687. Specification of Letters Patent. Patented June 12, 1917.

Application filed March 15, 1915. Serial No. 14,347.

*To all whom it may concern:*

Be it known that I, WILLIAM H. Voss, a citizen of the United States, residing at Davenport, in the county of Scott, State of Iowa, have invented new and useful Improvements in Gearing for Washing-Machines, of which the following is the specification.

This invention relates to washing machines, and more particularly to gearing and driving connections therefor.

It is an object of this invention to provide a vacuum washing machine and operating connections therefor in combination with a slidable wringer.

It is another object of this invention to provide driving connections for a vacuum washer simple and economical of construction and easy of manipulation and control.

Other objects and advantages of the invention will appear as the description to follow proceeds.

In the drawings:

Fig. 2 is a cross sectional plan view on the line 2—2 of Fig. 1.

Fig. 3 is an end elevation of a portion of the machine.

Figure 1:
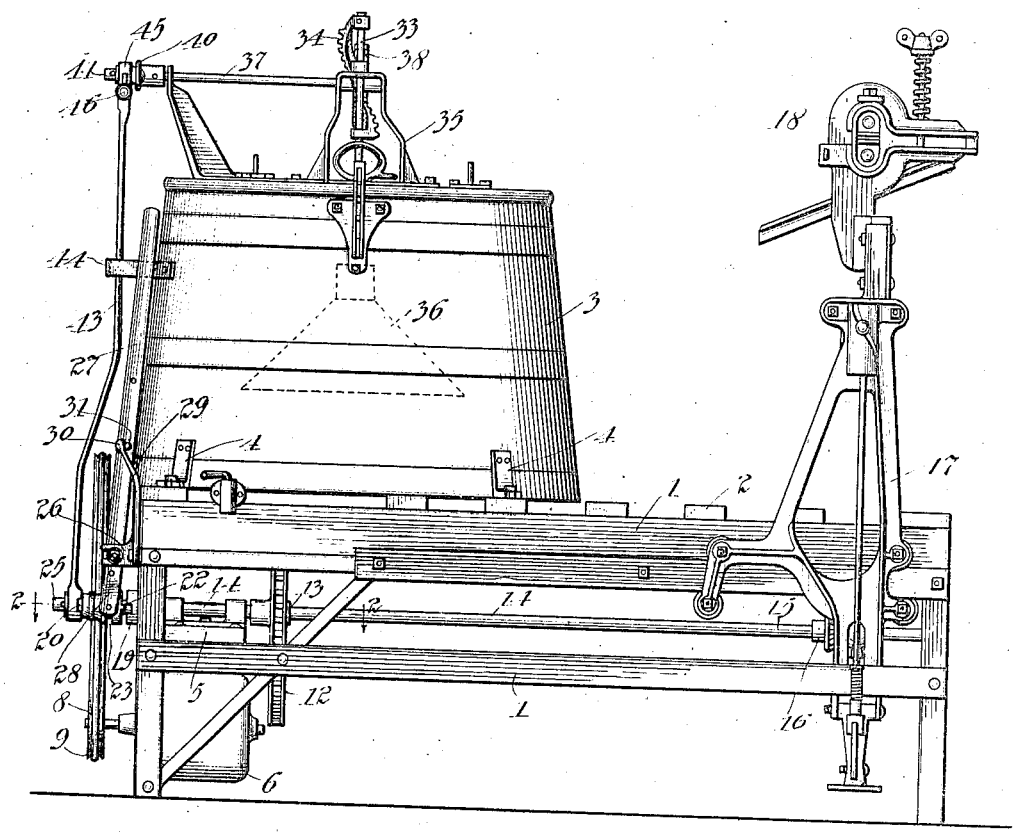
Figure 1 is a side elevation of the washing machine complete.

Fig. 4 is an elevation of the crank connection and clutch for driving the vacuum washer.

Fig. 5 is a cross sectional view showing the parrot beak connection between the driving mechanism and the dolly operating mechanism.

The machine is supported on a platform 1 made up preferably of angle irons and provided with slots 2 to receive an auxiliary tub, or tubs. The tub 3 of the washing machine is secured to the platform by means of lugs or ears such as 4. Depending from an auxiliary platform 5 in the machine is an electric motor which is preferably hung upon a hinged connection 7 so as to act at the same time as a belt tightener or driving pulley 8 as the motor drives the pulley 9 upon a stub shaft 10 located in the end of the frame of the machine and provided with sprocket 11 which by chain 12 drives the sprocket 13 fixedly mounted upon the main shaft 14 which runs from one end of the machine to the other.

The main shaft 14 is provided with a key or spline 15 so as to at all times drive the beveled pinion 16 which is connected with the framework of the slidable wringer, the platform 17 carrying a wringer 18 driven from a horizontal shaft operated by the beveled pinion 16, forming no part of the present invention but covered and claimed in a co-pending application. The construction is such that the platform 17 may be shifted to any point along the platform 1 and in any of its positions the wringer may be operated in either direction.

At its forward end the shaft 14 is provided with a fixed clutch element 19 and an extended portion 20. Loosely mounted on the extended portion 20 of the shaft 14 is a collar 21 having clutch elements 22 thereon to engage with the clutch element 19, and a peripheral groove or recess 23 to receive an operating fork. The collar 21 has a crank 24 thereon provided with a crank pin 25. Pivotally mounted upon the lug 26 upon the platform is a lever 27 terminating in a fork 28 engaged in the recess 23 above described. The connection between the lever 27 and its pivot is a slotted one whereby the lever may be moved slightly up or down. Extending upwardly from the lug 26 and formed integrally therewith is a projection 29 terminating in a rounded point 30. The lever 27 is provided with a pin 31 adjacent the rounded point 30. This construction is such that the lever may be slightly raised and swung to the right or left to disengage or engage the clutch 22—19, and when in either of these positions may be allowed to drop with the pin 31 on one side or other of the rounded point 30 which thus locks the clutch in engaged or disengaged position.

Mounted in the lid of the machine is a spiral vacuum washer gear comprising a reciprocating and oscillating washer shaft 33 to which is attached the spiral gear 34, said spiral gear operating between the lugs in the standard 35 so as to both reciprocate and oscillate the vacuum washer 36 as the shaft 33 is raised or lowered. Horizontally arranged in bearings mounted upon the cover of the machine is a shaft 37 provided with a sector gear 38 for operating the spiral rack 34. Fixed upon the end of the shaft 37 is a crank arm 40 provided at its end with a pin 41. Between the crank pin 41 and the crank pin 25 above described, extends a pitman 42 pivotally mounted at its lower end upon the crank pin 25 bent inwardly toward the tub, as shown at 43, passing through the guiding strap 44 and at its upper end provided with a parrot beak joint 45 operable by means of the extension 46 so as to engage or release the crank pin 41 at the will of the operator.

In operation the main shaft 14 being driven from the electric motor 6, or by other equivalent means, the clutch 19—22 may be disengaged or engaged by the operating lever 27. When the clutch is engaged the releasable pitman 42 serves to oscillate the operating shaft 37 which by reason of the engagement of the sector gear 38 mounted thereupon with a spiral rack 34, communicates proper motion to the vacuum washer head 36. This drive for the vacuum washer is spaced upon the end of the main shaft 14 and does not, therefore, affect the driving connections for the sliding wringer 17, each of these driving connections thus being accommodated to the other.

The parrot beak connection 45 may be disconnected when desired so as to permit the lid of the washing machine to be thrown back, whatever the position of the main shaft 14.

Having now described my invention I claim:

1. In a gearing for washing machines, a platform, a driving shaft mounted therein, a support, an oscillating and reciprocating shaft in said support, a second shaft oscillating on an axis lying along its length for operating said first oscillating shaft, and a driving connection between the driving shaft and the second oscillating shaft.

2. In a gearing for washing machines, an oscillating and reciprocating shaft, a shaft rocking on an axis lying along its own length to drive the same, a main shaft and a connection between said main shaft and said rocking shaft.

3. In a gearing for washing machines, a support, a shaft adapted to reciprocate and oscillate in the support, a rocking shaft adapted to operate said first shaft, a main shaft underneath the support and connections from the main shaft to the rocking shaft to drive the same.

4. In a gearing for washing machines, a support, a shaft adapted to reciprocate and oscillate in the support, a rocking shaft adapted to operate said first shaft, a main shaft underneath the support and connections from the main shaft to the rocking shaft to drive the same, including a clutch.

5. In a gearing for washing machines, a support, a shaft adapted to reciprocate and oscillate in the support, a rocking shaft adapted to operate said first shaft, a main shaft underneath the support and releasable connections from the main shaft to the rocking shaft to drive the same.

6. In apparatus of the class described, a platform, a driving shaft mounted therein, a crank loosely mounted on said driving shaft but adapted to be clutched thereto, a reciprocatory shaft, an oscillatory shaft adapted to drive the same, connections between said crank and said oscillatory shaft.

7. In apparatus of the class described, a platform, a driving shaft therein, a mechanism operable by said shaft but slidable with relation thereto, a vertical shaft, a rocking shaft for operating the same and connections from the driving shaft for operating said rocking shaft.

8. In apparatus of the class described, a platform, a driving shaft therein, a frame movable along said platform but having mechanism operable by said driving shaft, a support on said platform, a vertical oscillatory and reciprocatory shaft on said support, a rocking shaft for operating said vertical shaft and connections between said driving shaft and said rocking shaft.

9. In apparatus of the class described, a driving shaft, a vertical shaft, a rocking shaft to operate said vertical shaft, a crank on said driving shaft, a clutch device interposed between said crank and said driving shaft, a connection between said crank and said rocking shaft and a lever for throwing said clutch.

In witness whereof, I hereunto subscribe my name to this specification in the presence of two witnesses.

WILLIAM H. VOSS.

Witnesses:
WILLIAM E. PULS,
GEORGE W. CARDINAL.